Oct. 31, 1950     W. A. RAY     2,527,851
FLUID CONTROL VALVE
Filed Nov. 30, 1944

Inventor.
WILLIAM A. RAY,
John H. Rouse,
Attorney

Patented Oct. 31, 1950

2,527,851

UNITED STATES PATENT OFFICE 2,527,851

FLUID CONTROL VALVE

William A. Ray, Los Angeles, Calif., assignor to General Controls Co., a corporation Application November 30, 1944, Serial No. 565,824

3 Claims. (Cl. 137—139)

My present invention relates to fluid control valves and more particularly to those of the type having a reciprocable closure operated by a motor mounted on the casing of the valve and arranged generally at right-angles to the axis of movement of the closure.

An object of this invention is to provide a valve, of the character described, having aligned inlet and outlet passages, fluid flow between which passages is substantially "straight-lined."

Another object is to provide a valve, of the character described in the preceding object, the parts at the interior of which, between the inlet and outlet passages, are so formed that a minimum amount of resistance is offered to the flow.

Another object is to provide a valve which is so constructed that the velocity of the fluid is increased at the valve seat, and is maintained at substantially constant pipe velocity toward the outlet of the valve; a further object being to increase the flow capacity of such a valve by providing means for decreasing the velocity of the fluid directly after it passes the valve seat so that turbulence at that point is reduced.

Another object is to provide flow-controlling means which are removably mounted, as a unit, on the valve casing.

Another object is to provide means for so mounting the motor on the valve casing that it can be removed without disturbing the flow-controlling means.

Another object is to provide means for preventing passage to the motor of the fluid controlled by the valve; said means including means whereby, in the event of leakage of fluid at the connection between the motor and the valve, that fluid can pass through a vent to the exterior of the valve.

Another object is to provide an explosion-proof connection between the motor and the valve.

Other objects and advantages of the invention will be found in the description, the drawing, and the claims; and, for full understanding of the invention, reference is to be had to the following detailed description and accompanying drawing, wherein:

Figure 1:
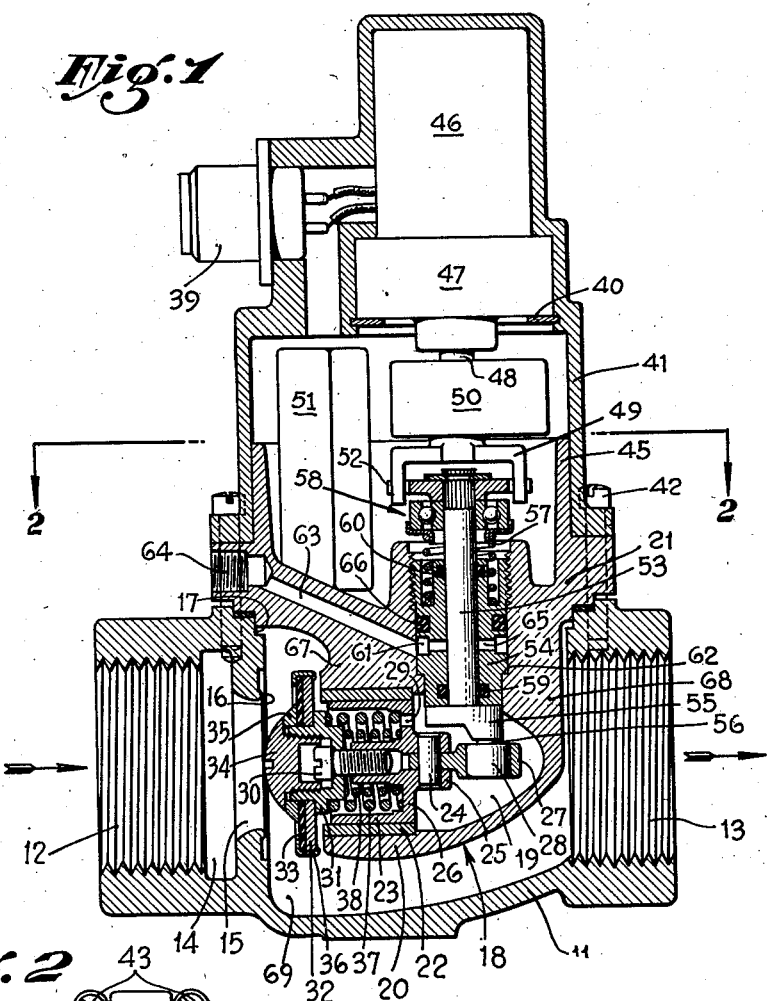
Figure 1 is a vertical sectional view of a valve embodying the invention.

In the drawing, the numeral 11 indicates a valve casing having aligned inlet and outlet passages 12 and 13, respectively. The inner portion of the inlet passage 12 is enlarged at 14 and reduced in diameter therebeyond to provide a valve port 15, the material around the inner end of the port being raised slightly to provide an annular valve seat 16. Removably mounted in a cylindrical opening 17 through the top wall of casing 11 is a compound structure which includes at its lower end a valve assembly generally indicated at 18 and, at its upper end, motor means for operating the same.

The valve assembly is contained within a cavity 19 formed in the bottom portion 20 of a structure 21, the cylindrical upper portion of which is formed to fit within the opening 17 and shouldered for sealing engagement with the portion of the casing therearound. Lining the open left-hand end of cavity 19 is a bushing 22 within which a hollow piston-like member 23 is reciprocable. Connected by a pin 24 to a slotted boss 25, extending centrally from the end wall 26 of piston 23, is a connecting rod 27 having in its enlarged right-hand end an opening for receiving the roller 28 of means for driving the valve assembly, which means will hereinafter be described. To avoid pressure effects in cavity 19, the end wall of the piston 23 is apertured at 29.

Connected to the piston 23 by a screw 30, threaded in a thickened inner portion of the end wall of the piston, is a cup-shaped element 31 which carries a disk-like closure 32 having a facing 33 of resilient material. The closure is secured to its carrier 31, abutting a shouldered outer portion thereof, by means of a screw 34 and a washer 35; the screw and washer being formed to provide a continuous rounded central front surface for the closure. Around the periphery of closure 32 is a flanged ring 36 which serves to clamp the outer margin of facing 33 to the closure.

Compressed between the closure-carrier 31 and the cylinder end-wall 26 is a pair of springs 37, 38 which urge the closure assembly toward engagement with the head of screw 30. When the piston is operated in a left-hand direction, by means hereinafter to be described, after closure 32—33 engages the seat 16 the piston continues to travel through a short distance so that the closure is held firmly in engagement with the seat under the force of springs 37, 38; clearance between screw 30 and the carrier 31 permitting s'ight rocking of the closure so that it can conform properly to the seat.

Figure 2:
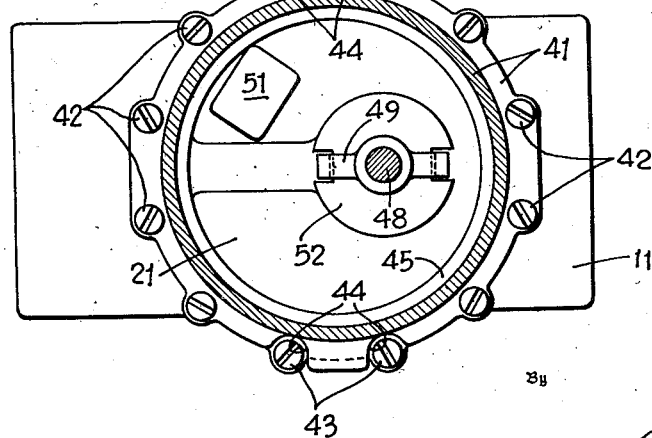
Figure 2 is a transverse section taken along the line 2—2 of Fig. 1.

Mounted on top of the structure 21 is a generally-cylindrical housing 41; this housing being secured to the valve casing by the eight screws 42, shown in Fig. 2, which pass through clearance openings in the flange of structure 21 and are threaded in the casing. In order that the housing can be removed without disturbing structure 21, this structure is independently secured to the valve casing by four screws 43 (Fig. 2), the flange of housing 41 being notched around the head of these screws as shown at 44. The structure 21 has at its top a thin annular skirt 45 which fits snugly within the bore of the lower portion of housing 41 to provide an explosion-proof connection.

Contained within housing 41 is a motor drive assembly comprising an electric motor 46 (for which there is an electrical connector 39) and reduction gearing 47 from which extends a drive shaft 48 having at its lower end a forked connection 49; limit switches 50, operated by shaft 48, being arranged intermediate the ends of the shaft. Since the motor and reduction gearing may be of conventional construction, and their purpose is merely that of operating shaft 48 at relatively slow speed, only the casings of these devices are shown; these casings being retained in position by a ring 40 snapped into a recess in the wall of housing 41. A typical example of the limit switches indicated at 50 is disclosed in my copending application Serial No. 539,489, filed June 9, 1944; now Patent No. 2,421,084, issued May 27, 1947. As is brought out in said application, the purpose of these switches (and the resistors contained within the receptacle indicated at 51) is to so control the energization of motor 46, upon operation of an external manual switch (not shown) between alternate positions, that shaft 48 is rotated in respectively opposite directions through a predetermined angle of substantially 180°.

The forks of connection 49 are loosely received in notches in the periphery of the head 52 of a shaft 53 which is rotatable in an elongated bushing 54, threaded in an opening through the top portion of structure 21, and is provided at its bottom end with an enlargement 55, eccentrically from which enlargement there extends a crank pin 56 which carries the roller 28.

It will be apparent that, when shaft 53 is rotated through 180° from its position shown, the closure member is seated; subsequent reverse rotation of the shaft returning the closure member to its original position.

The shaft 53 is urged upwardly by a spring 57 so that the top surface of the enlargement 55 is in sealing engagement with the bottom surface of bushing 54; the lower portion of the spring 57 being received in an annular recess in the bushing, and its top end bearing against the shaft head 52 through a thrust ball-bearing 58. Providing additional seals around shaft 53 is a pair of resilient annular members, or rubber rings, 59 and 60 contained in annular recesses formed in the bore of bushing 54 toward its opposite ends. In order to prevent any possibility of fluid passing into the motor housing, notwithstanding the sealing effect of rings 59 and 60 and the engagement of the shaft enlargement 55 with the underside of bushing 54, an annular recess 61 is provided in the periphery of bushing 54 above its shouldered engagement (indicated at 62) with structure 21. This recess is in communication with the atmosphere by way of a lateral passage 63, in structure 21, which is provided at its outer end with a threaded opening 64. Leading from recess 61 to the bore of bushing 54 are openings 65 whereby any fluid which may pass upwardly from the valve casing around stem 53 is vented through passage 63 to the atmosphere—or to some convenient place of disposal by means of a pipe (not shown) connected to the threaded opening 64. In a recess in the periphery of bushing 54 above recess 61 is another rubber ring 66 which seals the motor-housing end of the bushing.

The bottom portion 20 of structure 21, together with the closure member, is generally ovoid, as indicated in the section, such contour offering little resistance to flow of fluid through the valve casing; and the portions 67 and 68 which join the ovoid portion 20 to the structure 21 are tapered to form at their outer ends relatively thin webs which likewise offer but little resistance to the flow.

The cross-sectional area of the space between the valve casing and the ovoid structure 20 is approximately equal to the area of the outlet opening 13 so that, when the valve is open, the velocity of the fluid at these places is substantially constant. The lower portion of the valve casing directly behind the valve seat is enlarged, as indicated at 69, to provide what may be termed an "idling basin" which serves to decrease at that point the velocity of the fluid entering at relatively high velocity through the restricted port 15. I have found that by the provision of such an idling basin fluid turbulence, otherwise present in a high degree at this point, is prevented or considerably reduced and the flow capacity of the valve therefore increased.

The embodiment of my invention herein shown and described is obviously susceptible of modification without departing from the spirit of the invention, and I intend therefore to be limited only by the scope of the appended claims.

I claim as my invention:

1. In a fluid control valve: a casing having aligned inlet and outlet passages, said inlet passage being restricted at its inner end, means forming a valve seat around said restricted end of the inlet passage, said seat being disposed in a plane substantially at right-angles to the axis of the passages, the interior of said casing being enlarged between said passages, a closure movable generally along said axis into and out of engagement with said seat, and means for operating said closure and defined by means forming with the closure an ovoid structure arranged longitudinally along said axis, said structure being joined at one side to a wall of the casing and mounted within said enlargement of the casing in generally-spaced relation thereto, said casing being further enlarged directly adjacent the outlet side of said seat, and at the side of the structure opposite said one side thereof, to provide there a space, or idling basin, between the casing and said structure which space is substantially larger than that therebeyond in the direction of the outlet of the valve.

2. In a fluid control valve: a valve casing having inlet and outlet passages, a structure mounted on said casing so as to sealingly cover an opening through a wall thereof and including means extending through said opening for controlling fluid flow between said passages, a motor for operating said flow-controlling means and mounted on said structure exteriorly of said casing, common means for securing both the motor and the structure to the casing, and means for independently securing the structure to the casing so that the motor can be removed without disturbing the structure or unsealing said opening.

3. In a fluid control valve: a valve casing having inlet and outlet passages, a structure mounted in said casing so as to sealingly cover an opening through a wall thereof and including means extending through said opening for controlling fluid flow between said passages, said structure having a flange overlying the outer surface of said casing wall around said opening, a motor for operating said flow-controlling means and mounted on said structure exteriorly of said casing, the means for mounting said motor providing a flange overlying said structure-flange, means for securing both the motor and the structure to the casing and comprising screw means extending through openings in both of said flanges, and means for independently securing the structure to the casing so that the motor can be removed without disturbing the structure or unsealing said casing-opening and comprising screw means extending into the casing through openings in said structure-flange.

WILLIAM A. RAY.

REFERENCES CITED

The following references are of record in the file of this patent:

UNITED STATES PATENTS

| Number | Name | Date |
| --- | --- | --- |
| 597,141 | Craig | Jan. 11, 1898 |
| 1,999,496 | Adam, Jr. | Apr. 30, 1935 |
| 2,043,194 | Eggleston | June 2, 1936 |
| 2,169,696 | Hotchkiss | Aug. 15, 1939 |
| 2,266,485 | Williams | Dec. 16, 1941 |

FOREIGN PATENTS

| Number | Country | Date |
| --- | --- | --- |
| 54,200 | Switzerland | Jan. 14, 1911 |
| 220,898 | Great Britain | of 1924 |
| 435,083 | Great Britain | Sept. 13, 1935 |